(12) United States Patent
Abdal et al.

(10) Patent No.: US 12,322,027 B2
(45) Date of Patent: Jun. 3, 2025

(54) AVATAR GENERATION ACCORDING TO ARTISTIC STYLES

(71) Applicants: Rameen Abdal, Los Angeles, CA (US); Menglei Chai, Los Angeles, CA (US); Hsin-Ying Lee, San Jose, CA (US); Aliaksandr Siarohin, Los Angeles, CA (US); Sergey Tulyakov, Santa Monica, CA (US); Peihao Zhu, Los Angeles, CA (US)

(72) Inventors: Rameen Abdal, Los Angeles, CA (US); Menglei Chai, Los Angeles, CA (US); Hsin-Ying Lee, San Jose, CA (US); Aliaksandr Siarohin, Los Angeles, CA (US); Sergey Tulyakov, Santa Monica, CA (US); Peihao Zhu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 215 days.

(21) Appl. No.: 18/090,692

(22) Filed: Dec. 29, 2022

(65) Prior Publication Data

US 2024/0221281 A1    Jul. 4, 2024

(51) Int. Cl.
*G06T 15/02*    (2011.01)
*G06N 3/045*    (2023.01)
(Continued)

(52) U.S. Cl.
CPC ............ *G06T 15/02* (2013.01); *G06N 3/045* (2023.01); *G06N 3/088* (2013.01); *G06N 20/00* (2019.01); *G06T 11/00* (2013.01)

(58) Field of Classification Search
None
See application file for complete search history.

(56) References Cited

U.S. PATENT DOCUMENTS

| | | | |
|---|---|---|---|
| 6,732,146 B1 | 5/2004 | Miyake | |
| 2019/0035149 A1* | 1/2019 | Chen | G06V 40/166 |

(Continued)

FOREIGN PATENT DOCUMENTS

WO    2020139054 A1    7/2020

OTHER PUBLICATIONS

International Search Report and Written Opinion for International Application No. PCT/US2023/086016, dated Apr. 22, 2024 (Apr. 22, 2024)—10 pages.

*Primary Examiner* — Yanna Wu
(74) *Attorney, Agent, or Firm* — CM Law; Stephen J. Weed

(57) ABSTRACT

Domain adaptation frameworks for producing a 3D avatar generative adversarial network (GAN) capable of generating an avatar based on a single photographic image. The 3D avatar GAN is produced by training a target domain using an artistic dataset. Each artistic dataset includes a plurality of source images, each associated with a style type, such as caricature, cartoon, and comic. The domain adaptation framework in some implementations starts with a source domain that has been trained according to a 3D GAN and a target domain trained with a 2D GAN. The framework fine-tunes the 2D GAN by training it with the artistic datasets. The resulting 3D avatar GAN generates a 3D artistic avatar and an editing module for performing semantic and geometric edits.

15 Claims, 5 Drawing Sheets

(51) Int. Cl.
  *G06N 3/088*    (2023.01)
  *G06N 20/00*    (2019.01)
  *G06T 11/00*    (2006.01)

(56) References Cited

U.S. PATENT DOCUMENTS

| | | |
|---|---|---|
| 2019/0236531 A1 | 8/2019 | Adato et al. |
| 2019/0325379 A1 | 10/2019 | Medina et al. |
| 2020/0151559 A1* | 5/2020 | Karras .................... G06N 3/047 |
| 2021/0304452 A1* | 9/2021 | Lee ........................... G06T 7/50 |
| 2021/0335050 A1* | 10/2021 | Zavesky ............... G06V 10/945 |
| 2022/0044352 A1* | 2/2022 | Liao .................... G06F 18/2135 |
| 2022/0269999 A1 | 8/2022 | Arumugam |

* cited by examiner

AVATAR GENERATION ACCORDING TO ARTISTIC STYLES

TECHNICAL FIELD

Examples set forth in the present disclosure relate to machine learning, generative models, and training datasets. More particularly, but not by way of limitation, the present disclosure describes adaptation frameworks for training target domains according to one or more artistic datasets in order to produce avatars that are rendered in accordance with a selected artistic style.

BACKGROUND

Machine learning refers to mathematical models or algorithms that improve incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

A generative adversarial network (GAN) is a class of machine-learning frameworks in which two artificial neural networks (e.g., a generator and a discriminator) are trained together. Using a training dataset, the generator module is trained by generating new data (e.g., new synthetic images) which have the same or similar characteristics (e.g., statistically, mathematically, visually) as the reference data in the training dataset (e.g., thousands of sample images). The generator module generates candidates (e.g., new images) based on the reference data. The discriminator module evaluates the candidates by determining the degree to which each candidate is similar to the reference data (e.g., by assigning a value between zero and one). A candidate produced by the generator is classified as better (e.g., a value closer to one) if the discriminator concludes that the candidate is highly similar to the reference data. A candidate is classified as poor (e.g., a value closer to zero) if the discriminator concludes that it is less similar to the reference data (e.g., the candidate appears to be synthesized or fake). Typically, the generator and the discriminator are trained together. The generator learns and produces better and getter candidates, while the discriminator learns and becomes more skilled at identifying poor candidates.

Generative frameworks like GANs can be used to generate a realistic portrait based on a photographic image of a real face. Frameworks known as 3D-GANs are capable of generating a three-dimensional portrait based on a single two-dimensional image.

An avatar is a graphical illustration that represents a device user (e.g., a computer or mobile device user), or a character or alter ego that represents that user. Avatars may be personalized based on preferences of the user or others.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element. When referring to a non-specific one or more elements the lower-case letter may be dropped.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Figure 1:
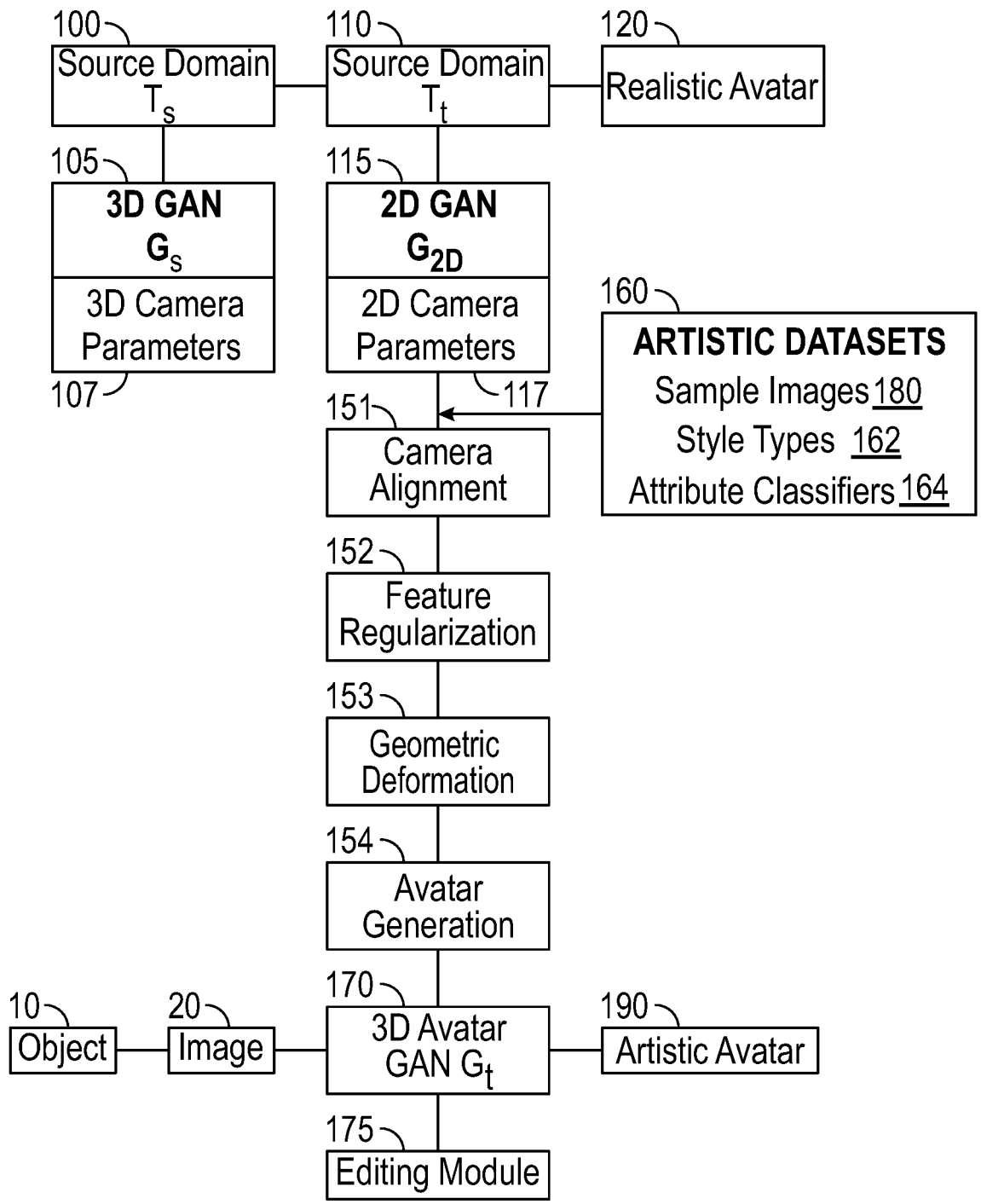
FIG. 1 is a block diagram of an example adaptation framework.

An avatar having an artistic style ("artistic avatar") generated using a generative adversarial network (GAN). In an example implementation, avatar generation includes selecting a source domain that has been trained according to a source GAN (e.g., a 3D GAN), and selecting a target domain that has been trained according to a target GAN (e.g., a 2D GAN). An artistic dataset (including artistic feature, attributes, or a combination thereof) trains the target domain to produce an avatar GAN (e.g., a 3D Avatar GAN). The trained avatar GAN generates an artistic avatar that is based on a real image and includes the features and attributes found in the artistic dataset.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Photo-realistic portrait face generation is an iconic application demonstrating the capability of generative models, especially GANs. Models referred to as 3D GANs are capable of learning 3D structures without 3D supervision. Such unsupervised training is feasible when the large-scale training datasets contain objects that have a relatively consistent geometry (e.g., thousands of images of human faces), thereby allowing the 3D GAN to learn from a distribution of shapes and textures. For example, as shown in the block diagram of FIG. 1, an example system for generating a realistic avatar 120 includes source domain 100 (e.g., including a 3D GAN 150) and a target domain 110 that has been trained using a training dataset of real images (e.g., thousands of images of human faces).

As used herein, the term "artistic" is used to refer to aesthetic qualities of human or machine generated content; and the term "artistic style" is used to refer to aspects or features of those aesthetic qualities (e.g., purposeful or arbitrary exaggerations of geometry, texture, or both). In contrast to datasets containing real faces, artistic datasets 160 typically include works of art (e.g., sample images 180) having arbitrary exaggerations of both face geometry and texture. An artistic dataset 160 in some implementations includes a large number of sample artistic images 180 having an artistic style, such as caricature, Pixar-like, cartoon, graphic novel, and the like. An artistic dataset 160 may include unusual, highly variable geometry, and arbitrary feature exaggerations—one or more of which may vary depending on the context, the artist, proscribed style guides, and production requirements. For example, the nose, cheeks, and eyes can be arbitrarily drawn, depending on the style of the artist as well as the features of the subject. In some implementations, the systems and methods described herein include a framework for adapting pre-trained GAN models to work with artistic datasets.

FIG. 1 is a block diagram of an example domain adaptation framework 150. In the example shown, the source domain 100 is a pre-trained 3D GAN 105. The target domain 110 is a 2D GAN 115. Instead of training the 2D GAN 115 using real face images, the 2D GAN 115 in some implementations is trained on artistic datasets 160.

Training the 2D GAN 115 using the artistic datasets 160 produces a 3D Avatar GAN 170 that is capable of generating an artistic avatar 190 (e.g., a caricature) that is based on an image 20 (e.g., a photograph) of an object 10 such as a human face. The artistic avatar 190 includes features of the object 10 and the attributes established by the artistic dataset 160. In this aspect, the adaptation framework 150 preserves the identity of the subject. In other words, the artistic avatar 190 is recognizable as an artistic representation of the person in the image 20.

The domain adaptation framework 150 in some implementations includes a camera alignment module 151, a feature regularization module 152, a geometric deformation module 153, an avatar generation module 154, and an editing module 175.

The camera alignment module 151 in some implementations includes an optimization-based method of aligning the distributions of camera parameters across the domains. Most available artistic datasets 160 do not include camera parameters. For example, if a sample image was drawn by an artist instead of photographed using a camera, the data associated with that sample image will not include camera parameters.

The feature regularization module 152 in some implementations includes regularization tools associated with learning the texture, geometry, and depth as established in the artistic datasets 160. The regularizations improve color and texture, avoid degenerate geometric solutions (e.g., flat shapes), and maintain the depth of the resulting avatar relative to the background.

The data in the source domain ($T_S$) 100 and the target domain ($T_t$) 110 are not paired. The target domain ($T_t$) 110 is assumed to have no camera parameter annotations. These conditions impact the choice of a discriminator (D). The feature regularization module 152 in some implementations includes the unconditional version of the dual discriminator, as proposed in an efficient, geometry-aware 3D GAN (referred to herein as "EG3D"), in which the discriminator is not conditioned on the camera parameters. During the training, the 3D Avatar GAN ($G_t$) 170 generates arbitrary images with pose, using $M(\theta', \phi', c', r')$. The discriminator (D) discriminates these images using arbitrary images from the target domain ($T_t$) 110. The feature regularization module 152 in some implementations uses a training scheme known as StyleGAN-ADA and the R1 regularization in order to adapt the source domain ($T_S$) 100 to the target domain ($T_t$) 110 ($T_s \rightarrow T_t$).

The geometric deformation module 153 in some implementations includes a deformation-based technique for modeling the exaggerated geometry found in some artistic datasets 160. In some implementations, the editing module 175 is based on the techniques established for the geometric deformation module 153.

The regularizers described herein limit the geometric changes when adapting $T_s \rightarrow T_t$. For larger geometric deformations (e.g., those found in an artistic dataset 160 for caricatures) the adaptation framework 150 in some implementations includes a geometric deformation module 153.

The geometric deformation module 153 in some implementations includes a process for editing the geometry by using the properties of the tri-plane features learned by EG3D. In this example, the geometric deformation module 153 starts by analyzing these three planes in the source 3D GAN ($G_S$) 105. In general, the frontal plane encodes most of the information required to render a final image. To quantify this, the geometric deformation module 153 in some implementations samples images and depth maps from the source 3D GAN ($G_S$) 105 and then swaps the front plane and the other planes from two random images. The geometric deformation module 153 then compares the difference in RGB values of the images and the Chamfer distance of the depth maps. While swapping the frontal tri-planes, the final images are completely swapped, and the Chamfer distance changes by about 80 to 90%, matching the swapped image depth map. In the case of the other two planes, the RGB image is not much affected and the Chamfer distance of the depth maps is reduced by only about 20 to 30% in most cases.

In this aspect, the geometric deformation module 153 manipulates the 2D front plane features in order to learn additional deformations and exaggerations. The geometric deformation module 153 in some implementations includes learning a TPS (Thin Plate Spline) network on top of the front plane.

The avatar generation module 154 in some implementations includes a process for linking the latent spaces associated with the source and target domains. Compared to 2D GANs, the latent spaces associated with a 3D GAN are more entangled, making it more challenging to link the latent spaces between domains. A latent space is a compressed or simplified representation of the data associated with a particular feature. For example, the latent space associated with the tip of the nose may be reduced to a data point in space which can be plotted on a graph, whereas the entire shape of the nose cannot. Simplified latent spaces are easier to analyze, compared to analyzing an entire feature. In this aspect, the latent spaces act as an intermediate step during training.

GANs are one type of generative model. One GAN known as StyleGAN is particularly useful with smaller high-quality datasets such as FFHQ, AFHQ, and LSUN objects. The disentangled latent space learned by StyleGAN has been shown to exhibit semantic properties conducive to semantic image editing. CLIP-based image editing and domain transfer are another set of works enabled by StyleGAN.

Algorithms to project existing images into a GAN latent space are a part of most types of GAN-based image editing. There are mainly two types of methods to enable such a projection: optimization-based and encoder-based. On top of both streams of methods, the generator weights can be further modified after obtaining initial inversion results.

Some existing systems attempt to extract 3D structure from pre-trained 2D GANs. Recently, inspired by Neural Radiance Fields (NeRF) modeling, GAN architectures have been proposed that combine implicit or explicit 3D representations with neural rendering techniques.

The systems and methods described herein, in some implementations, build upon EG3D, which includes current, state-of-the-art results for human faces trained on the FFHQ dataset. In some implementations, the systems and methods described herein employ 2D to 3D domain adaptation and distillation, making use of synthetic 2D data from sources such as StyleCariGAN and DualStyleGAN.

Training a 3D GAN using an artistic dataset 160 presents challenges due to the arbitrary distribution of geometry and texture found in many works of art. In some implementations, each artistic dataset 160 includes a large number of 2D sample images 180, each one associated with a style type 162 (e.g., caricature, Pixar-like) and one or more attribute classifiers 164, as described herein. In this aspect, the domain adaptation framework 150 involves fine-tuning the 3D GAN 105 using the 2D artistic works from an artistic dataset 160. In this context, the domain adaptation framework 150 includes starting with an existing 3D-GAN ($G_s$) 105 associated with source domain ($T_s$) 100. One of the goals of the adaptation framework 150 is to produce a 3D Avatar GAN ($G_t$) 170 associated with the target domain ($T_t$) 110 while maintaining the semantic, style, and geometric properties of the 3D-GAN ($G_s$) 105—and at the same time preserving the identity of the subject between the domains ($T_s \leftrightarrow T_t$).

In some implementations, in order to preserve the identity of the subject, the avatar generation module 154 uses one or more attribute classifiers 164 associated with the artistic dataset 160. The style type 162 and the attribute classifiers 164 provide the coupled attribute information between the image 20 and the artistic rendering (e.g., the caricature). In some implementations, the attribute classifier 164 is applied in post-hoc manner. If applied during training, the attribute classifier 164 can impact the texture in the target domain and can sometimes degenerate to relatively narrow style outputs. To avoid overfitting into the 3D-GAN ($G_s$) 105 and to encourage the easier transfer of the optimized latent code to the 3D Avatar GAN ($G_t$) 170, the avatar generation module 154 in some implementations includes a W space optimization. Finally, the avatar generation module 154 in some implementations initializes this w code for the 3D Avatar GAN ($G_t$) 170 and applies an additional attribute classifier loss for the target domain ($T_t$) 110, along with the depth regularization (e.g., the equation for R(D)) as described herein. In some implementations, the attribute classifier 164 generalizes across all domains and the W/W+ space optimization is applied to improve the quality and diversity of the outputs.

The editing module 175, in certain aspects, is based on the techniques established for and accomplished by the geometric deformation module 153. For example, the editing module 175 is guided by the learned latent space. The domain adaptation framework 160 is designed to preserve the properties of the W and S latent spaces. The editing module 175 in some implementations includes a process for performing semantic edits using available tools, such as InterFaceGAN, GANSpace, and StyleSpace. The editing module 175 in some implementations includes a process for performing geometric edits using the TPS module and the Δs interpolation, as described herein. To perform video editing, the editing module 175 in some implementations includes an encoder for EG3D (which is based on e4e) to encode videos and transfer the edits from the 3D-GAN ($G_s$) 105 to the 3D Avatar GAN ($G_t$) 170 based on the w codes.

Figure 2:
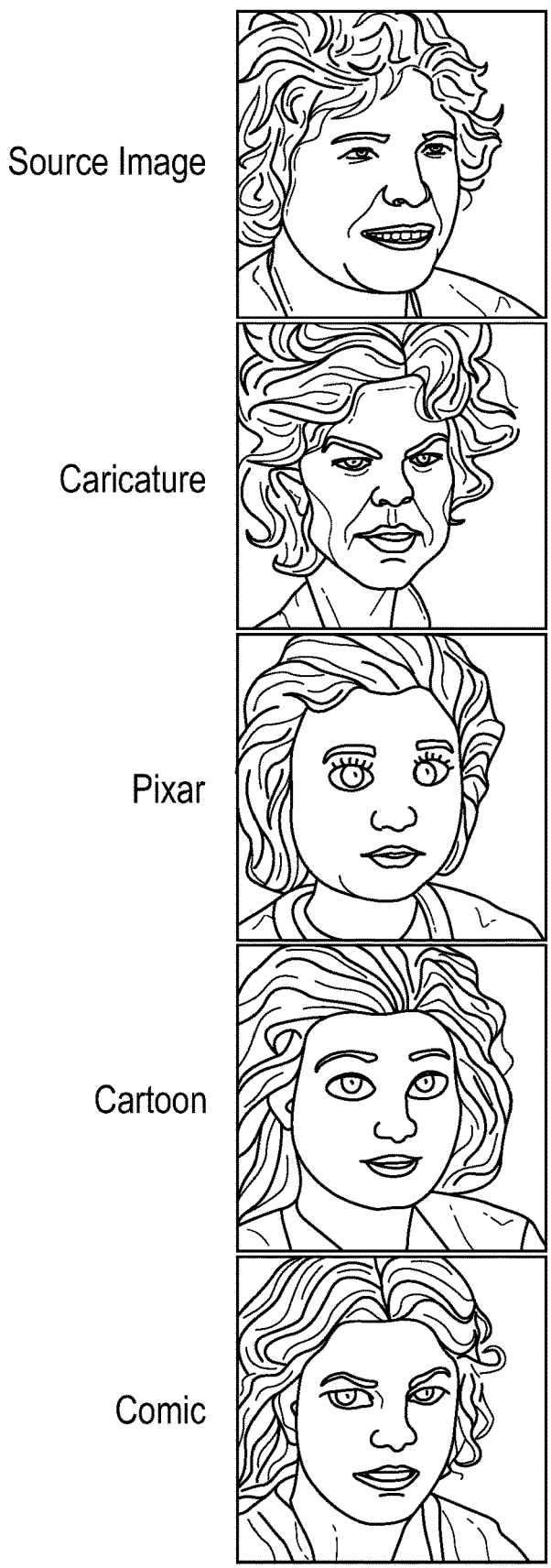
FIG. 2 is an illustration of a source image and several example artistic avatars generated according to the adaptation framework.

FIG. 2 is an illustration of a source image 20 (e.g., a single photograph of a person) along with several example artistic avatars 190 which are the result of the domain adaptation framework 150 described herein. The results include example avatars 190 associated with various artistic datasets 160 and style types 162, including caricature, Pixar-like, cartoon, and comic (e.g., graphic novel, classic comic books).

Selecting appropriate ranges for camera parameters between the domains ($T_s \leftrightarrow T_t$) is one of the methods of achieving high-fidelity geometry and texture detail. Because the target domain ($T_t$) 110 does not contain camera parameter notations in some implementations, the domain adaptation framework 150 will suppress undesirable artifacts, such as low-quality texture in different views and flat geometry. Typically, the camera parameters are empirically estimated, directly computed from the dataset (e.g., using an off-the-shelf pose detector) or learned during training. Directly estimating the camera parameters would be difficult because the artistic dataset 160 typically does not include any 3D information. Instead, the camera alignment module 151 in some implementations includes ensuring that a statistical distribution 401 (FIG. 4) based on the sets of camera parameters is consistent between the domains ($T_s \leftrightarrow T_t$).

For the target domain ($T_t$) 110 in some implementations a StyleGAN2 trained on FFHQ is used, fine-tuned on artistic datasets. The camera alignment module 151 in some implementations assumes that the intrinsic parameters (e.g., focal length, optical center, resolution) of all the cameras are the same. Then, the camera alignment module 151 matches the statistical distribution 401 of the extrinsic camera parameters (e.g., pose, orientation, location coordinates) of the 3D GAN ($G_S$) 105 with the 2D GAN ($G_{2D}$) 115—and then conducts the training using the matching distribution 401. In this aspect, the camera alignment module 151 includes an optimization-based method to match the sought distribution 401. In some implementations, one of the first steps is to identify a canonical pose image in the 2D GAN ($G_{2D}$) 115. The canonical pose image in some implementations is an image for which the yaw, pitch, and roll parameters are zero. The image corresponding to the mean latent code satisfies this property. Let:

$$I_s(w, \theta, \phi, c, r) = G_s(w, M(\theta, \phi, c, r))$$

and let $$I_{2D}(w) = G_s(w)$$

represent an arbitrary image generated by the 3D GAN ($G_s$) 105 and the 2D GAN ($G_{2D}$) 115, respectively, given the w code variable.

Let $k_d$ be the face key-points detected by the detector $K_d$; then $$(c', r') := \underset{(c,r)}{\mathrm{argmin}} L_{kd}\big(I_s(w'_{avg}, 0, 0, c, r), I_{2D}(w_{avg})\big),$$

where $L_{kd}(I_1, I_2) = \|k_d(I_1) - k_d(I_2)\|_1$ and where $w_{avg}$ is the mean w latent code associated with the 2D GAN ($G_{2D}$) 115, and $w'_{avg}$ is the mean w latent code associated with the 3D GAN ($G_s$) 105. In our results, r' is determined to be approximately 2.70 and c' is approximately [0.0, 0.05, 0.17].

The next step is to determine a safe range of the $\theta$ and $\phi$ parameters. In accordance with resources such as StyleFlow and FreeStyleGAN, we set these parameters as $\theta' \in [-0.45, 0.45]$ and $\phi' \in [-0.35, 0.35]$ in radians.

Figure 3:
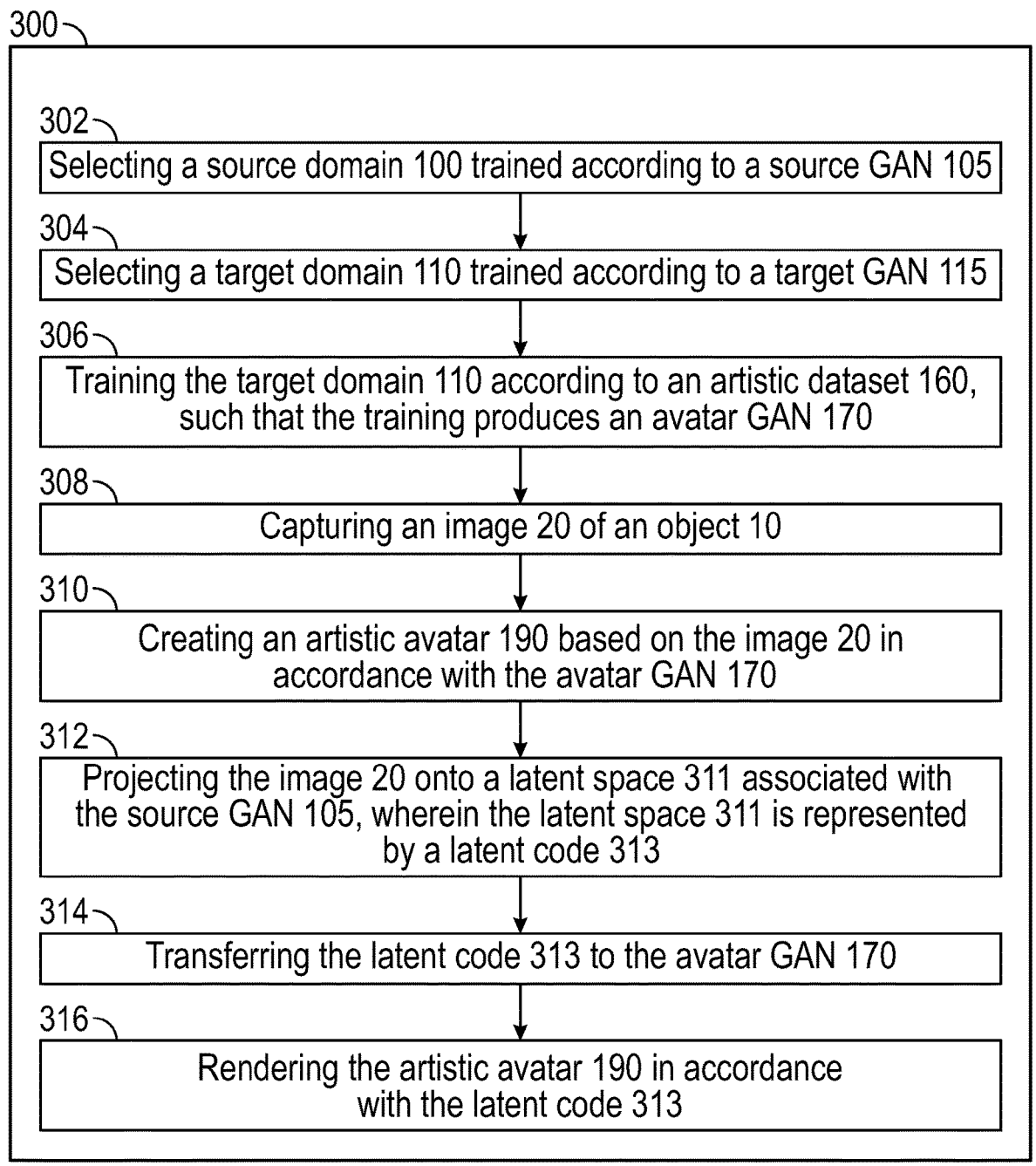
FIG. 3 is a flow chart listing the steps in an example method of generating an artistic avatar in accordance with an avatar GAN produced and trained according to the adaptation framework.

FIG. 3 is a flow chart 300 listing the steps in an example method for generating an artistic avatar 190 in accordance with an avatar GAN 170 produced and trained according to the domain adaptation framework 150 described herein. Although the steps are described in the context of training an avatar GAN 170, other uses and implementations of the steps described, for other types of system, will be understood by one of skill in the art from the description herein. One or more of the steps shown and described may be performed simultaneously, in a series, in an order other than shown and described, or in conjunction with additional steps. Some steps may be omitted or, in some applications, repeated.

Block 302 recites an example step of selecting a source domain 100 that has been trained according to a source GAN 105. In some implementations, the source domain 100 is a pre-trained 3D GAN 105.

Block 304 recites an example step of selecting a target domain 110 that has been trained according to a target GAN 115. In some implementations, the target domain 110 is a 2D GAN 115 trained using real face images.

Block 306 recites an example step of training the target domain 110 according to an artistic dataset 160, such that the training produces an avatar GAN 170. Instead of training the target domain 110 using real face images, block 306 recites an example step of training the target domain 110 using one or more artistic datasets 160 as described herein.

Block 308 recites an example step of capturing an image 20 of an object 10. The object 10 in some implementations is the face of a person. The source image 20 in some implementations is a photograph of the face captured by a camera, retrieved from a memory, or otherwise obtained.

Block 310 recites an example step of generating an artistic avatar 190 based on the image 20 and in accordance with the avatar GAN 170 produced by the training.

Block 312 recites an example step of projecting the image 20 onto a latent space 311 associated with the source GAN 105, wherein the latent space 311 is represented by a latent code 313. Block 314 recites an example step of transferring the latent code 313 to the avatar GAN 170. Block 316 recites an example step of rendering the artistic avatar 190 in accordance with the latent code 313.

Figure 4:
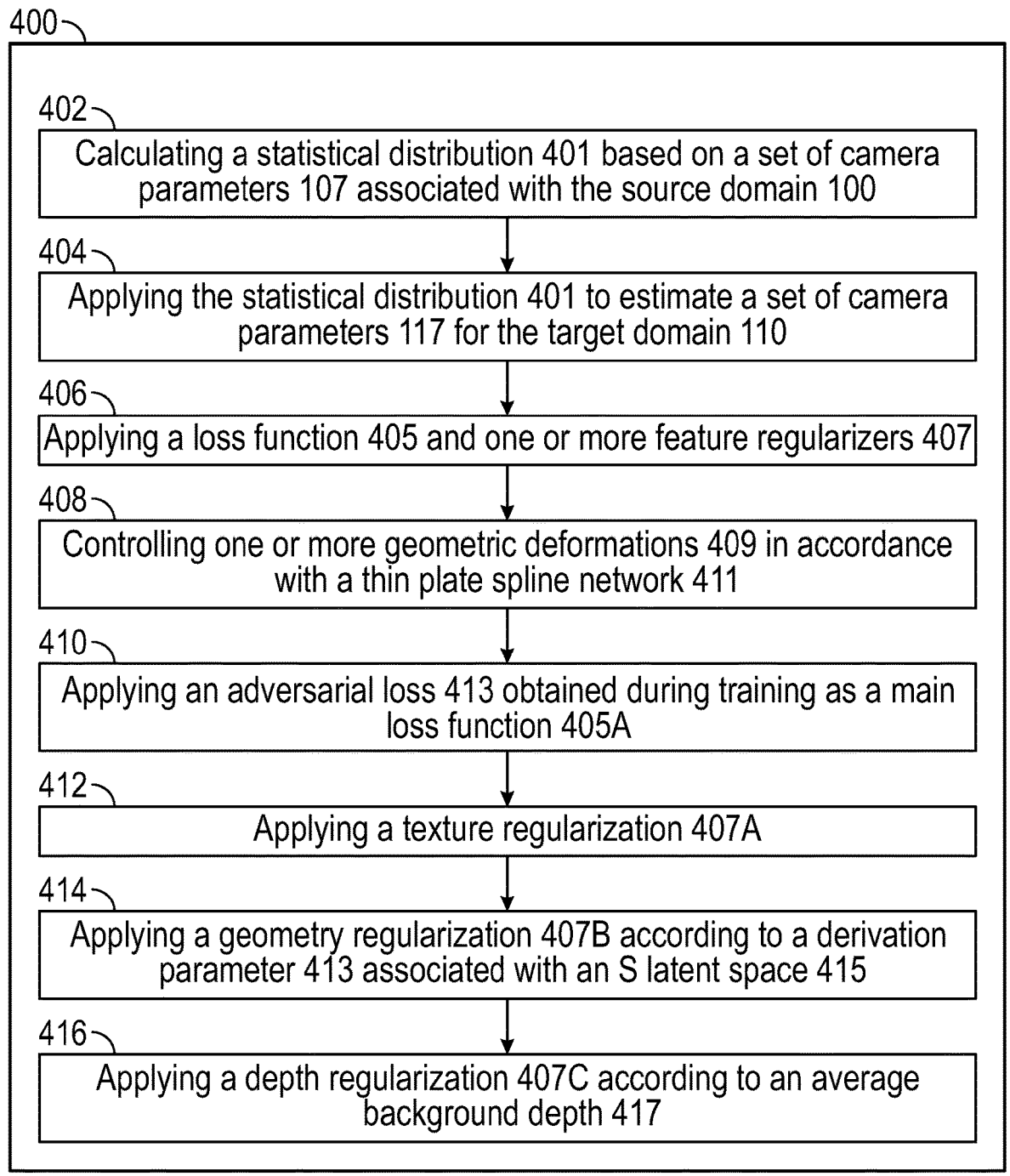
FIG. 4 is a flow chart listing the steps in an example method of training a target domain according to the adaptation framework.

FIG. 4 is a flow chart 400 listing the steps in an example method of training a target domain 110 according to the domain adaptation framework 150 described herein. Although the steps are described in the context of training an avatar GAN 170, other uses and implementations of the steps described, for other types of system, will be understood by one of skill in the art from the description herein. One or more of the steps shown and described may be performed simultaneously, in a series, in an order other than shown and described, or in conjunction with additional steps. Some steps may be omitted or, in some applications, repeated.

Block 402 recites an example step of calculating a statistical distribution 401, as described above, based on the set of camera parameters 107 associated with the source domain 100.

Block 404 recites an example step of applying the statistical distribution 401 to estimate a set of camera parameters 117 for the target domain 110.

Block 406 recites an example step of applying a loss function 405 and one or more feature regularizers 407. The feature regularization module 152 in some implementations includes one or more loss functions 405 and regularizers 407 to be applied to a selected set of parameters to be updated in the 3D Avatar GAN ($G_t$) 170. Because the artistic datasets 160 typically do not stem from a consistent 3D model or form (e.g., because the works are artistic), the generator module associated with the 3D Avatar GAN ($G_t$) 170, in some cases, tends to converge toward an easy, degenerative solution having a flat geometry. In this aspect, the feature regularization module 152 in some implementations seeks to benefit from the geometric data in the 3D GAN ($G_s$) 105.

Block 408 recites an example step of controlling one or more geometric deformations 409 in accordance with a Thin Plate Spline network 411. The TPS network 411, in some implementations, is conditioned both on the front plane features as well as the W latent space features, in order to enable multiple transformations. The architecture of the module, in certain aspects, is similar to the standard SyleGAN2 layer, with an MLP appended at the end to predict the control points that transform the features. In some implementations, this module is trained separately; after the 3D Avatar GAN ($G_t$) 170 has been trained. In some cases, joint training generates instabilities which may be associated with exploding gradients related to the relatively domain gap between the source domain ($T_S$) 100 and the target domain ($T_t$) 110, at least in the initial stages. Formally, we define this transformation as:

$$T(w, f) := \Delta c$$

where w is the latent code, f is the front plane, and c are the control points.

Let $c_1$ be the initial control points producing an identity transformation. Let ($c_1$, $c_2$) be the control points corresponding to front planes ($f_1$, $f_2$) sampled using the W codes ($w_1$, $w_2$), respectively. Let ($c'_1$, $c'_2$) be points with the W codes ($w_1$, $w_2$) swapped in the TPS network. To regularize and encourage the TPS module to learn different deformations, the geometric deformation module 153 in some implementations includes:

$$R(T_1) := \alpha \sum_{n=1}^{2} \|c_I - c_n\|_1 - \beta \|c_1 - c_2\|_1 - \sigma \|c'_1 - c'_2\|_1$$

The geometric deformation module 153 in some implementations includes an additional loss term, in order to learn relatively extreme exaggerations in the target domain ($T_t$) 110. Let S(I) be the soft-argmax output of a face segmentation network, given an image I and assuming the S generalizes to caricatures, then $$R(T_2) := \|S(G_t(w)), S(I_t)\|_1$$

The avatar generation module 154 in some implementations includes a process for linking the latent spaces of the 3D-GAN ($G_s$) 105 and the latent spaces of the 3D Avatar GAN ($G_t$) 170. The process of linking the latent spaces is one part of using the 3D Avatar GAN ($G_t$) 170 to generate a personalized 3D artistic avatar 190 based on single image 20 (e.g., a reference photograph) of an object 10 (e.g., the face of a person). In general, there is often a discrepancy between the coupled latent spaces when dealing with the projection of a real 2D photographic image using a 3D generator.

The avatar generation module 154 in some implementations includes projecting the image 20 onto a latent space 311 associated with the 3D-GAN ($G_s$) 105, then transferring the latent code 313 to the 3D Avatar GAN ($G_t$) 170, and then further optimizing the image 20 to generate a 3D artistic avatar 190. The avatar generation module 154 in some implementations includes an optimization-based process to find the w code that minimizes the similarity between the generated avatar 190 and the real image 20 in the 3D-GAN ($G_s$) 105. This process includes aligning the cameras, as described herein. The avatar generation module 154 in some implementations includes using pixel-wise MSE loss and LPIPS loss to project the image 20 into the 3D-GAN ($G_s$) 105.

Block 410 recites an example step of applying an adversarial loss 413 obtained during training as the main loss function 405A. In some implementations, the feature regularization module 152 uses the adversarial loss 413 obtained during training as a main loss function 405A. In this example, the main loss function 405A is the standard, non-saturating loss used to train the generator and discriminator networks (e.g., the networks associated with the efficient, geometry-aware 3D GAN known as "EG3D"). The feature regularization module 152 in some implementations also includes a lazy density regularization to ensure consistency of the density values in the final, fine-tuned 3D Avatar GAN ($G_t$) 170.

Block 412 recites an example step of applying a texture regularization 407A as described herein. Texture data includes multiple layers and can be entangled with the geometry information. The feature regularization module 152 in some implementations makes use of the fine-style information encoded in relatively later layers, updating the tRGB layer parameters (outputting tri-plane features) before the neural rendering stage. Moreover, because the network needs to adapt to a color distribution associated with the target domain ($T_t$) 110, the feature regularization module 152 in some implementations updates the decoder (MLP layers) of the neural rendering pipeline. Given the EG3D architecture, the feature regularization module 152 in some implementations updates the super-resolution layer parameters to improve the coherency between the low-resolution and high-resolution outputs seen by the discriminator.

Block 414 recites an example step of applying a geometry regularization 407B according to a derivation parameter 413 associated with an S latent space 415. The feature regularization module 152 in some implementations updates the relatively earlier layers with regularization, in order to allow the network to learn the structure distribution of the target domain ($T_t$) 110 and, at the same time, to improve the preservation of the properties associated with the W and S latent spaces. Updating the earlier layers encourages a linkage between the latent spaces of the source domain ($T_S$) 100 and the target domain ($T_t$) 110. In this aspect, the feature regularization module 152 updates the deviation parameter ($\Delta s$) 413 from the s activations of the S latent space 415. The s parameters are predicted by A(w), where A is the learned affine function in EG3D. In order to preserve the identity as well as geometry, such that the optimization of the deviation parameter ($\Delta s$) 413 does not deviate too far away from the original source domain ($T_s$) 100, the feature regularization module 152 in some implementations includes a regularizer, given by:

$$R(\Delta s) := \|\Delta s\|_1$$

The regularizer $R(\Delta s)$ in some implementations is applied using density regularization. Surprisingly, after training, we can interpolate between s and (s+$\Delta s$) parameters to interpolate between the geometries of samples in the source domain ($T_S$) 100 and the target domain ($T_t$) 110.

Block 416 recites an example step of applying a depth regularization 407C according to an average background depth 417. Although the geometry regularization 407B described above produces improvements in geometry for the target domain ($T_t$) 110, some samples from the 3D Avatar GAN ($G_t$) 170 can still produce cases having a relatively flatter geometry. Such cases are difficult to detect. The feature regularization module 152 in some implementations includes evaluating the depth of the background relative to the foreground. In this aspect, the feature regularization module 152 includes an additional regularization called a depth regularization 407C which encourages the average background depth 417 associated with the 3D Avatar GAN ($G_t$) 170 to be similar to that found in the source 3D GAN ($G_S$) 105. For example, let $S_b$ represent a face background segmentation network. The feature regularization module 152 computes the average background depth 417 of the samples given by the source 3D GAN ($G_S$) 105. This average depth 417 is given by:

$$a_d := \frac{1}{M} \sum_{n=1}^{M} \left( \frac{1}{N_n} \|D_n \odot S_b(I_n)\|_F^2 \right)$$

In this equation, $D_n$ is the depth map of the image $I_n$ sampled from the source 3D GAN ($G_S$) 105. The symbol $\odot$ represents the Hadamard product, M is the number of the sampled images, and $N_n$ is the number of background pixels in the image $I_n$. Finally, the depth regularization 407C in some implementations is defined as:

$$R(D) := \|a_d \cdot J - (D_t \odot S_b(I_t))\|_F$$

where $D_t$ is the depth map of the image $I_t$ sampled from the 3D Avatar GAN ($G_t$) 170 and J is the matrix of ones having the same spatial dimensions as D.

Techniques described herein may be used with one or more of the computing systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

Figure 5:
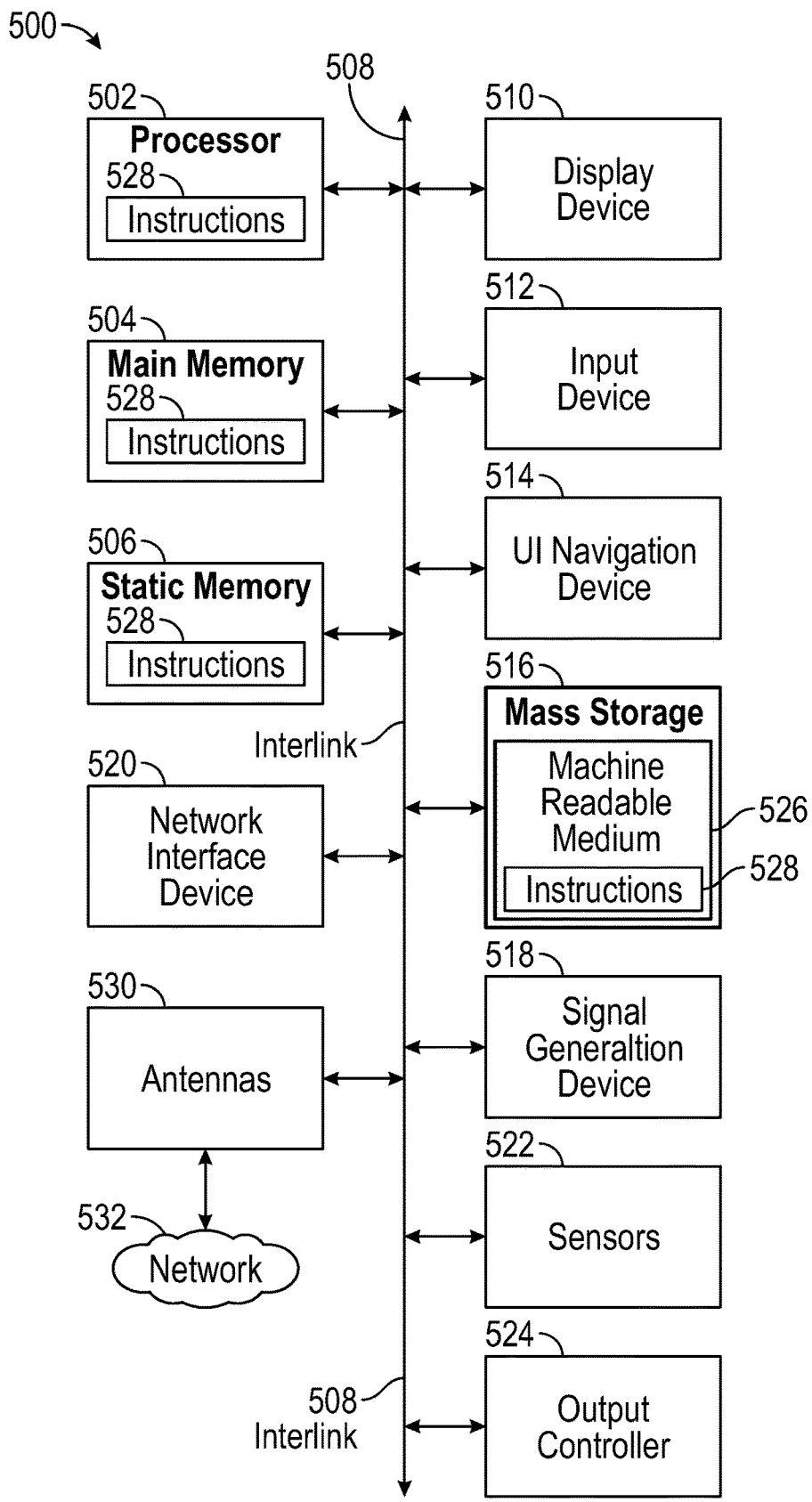
FIG. 5 is a block diagram of a sample configuration of a machine adapted to implement the method of generating 3D representations of objects in accordance with the systems and methods described herein.

FIG. 5 illustrates an example configuration of a machine 500 including components that may be incorporated into the processor 502 adapted to manage the 3D asset construction.

In particular, FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the features described herein. Further, while only a single machine 500 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computing systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computing system or processor) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. I$_n$ some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flowcharts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computing system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An avatar generation method, comprising:
   selecting a source domain trained according to a source generative adversarial network (GAN);
   selecting a target domain trained according to a target GAN;
   training the target domain with an artistic dataset, wherein training the target domain comprises:
   calculating a statistical distribution based on a source set of camera parameters associated with the source domain,
   applying the statistical distribution to estimate a target set of camera parameters for the target domain,
   applying to the target set of camera parameters a loss function and one or more feature regularizers, and
   controlling one or more geometric deformations in accordance with a Thin Plate Spline network, such that the training produces an avatar GAN based on the target set of camera parameters, the loss function, the one or more feature regularizers, and the one or more geometric deformations;
   capturing an image of an object; and
   generating an avatar based on the image in accordance with the avatar GAN.

2. The method of claim 1, wherein generating the avatar further comprises:
   projecting the image onto a latent space associated with the source GAN, the latent space represented by a latent code;
   transferring the latent code to the avatar GAN; and
   rendering the avatar in accordance with the latent code.

3. The method of claim 1, wherein the source GAN comprises a three-dimensional GAN, and
   wherein the target GAN comprises a two-dimensional GAN.

4. The method of claim 1, wherein the artistic dataset comprises:
   a plurality of sample images, each associated with a style type and one or more attribute classifiers,
   wherein the style type is an artistic style selected from a group consisting of caricature, Pixar, cartoon, and comic.

5. The method of claim 1, wherein applying the loss function and the one or more feature regularizers further comprises:
   applying an adversarial loss obtained during the training as a main loss function;
   applying a texture regularization to one or more layers;
   applying a geometry regularization according to a derivation parameter associated with an S latent space; and
   applying a depth regularization according to an average background depth.

6. A system comprising:
   a computing device comprising a processor, a memory, and programming in the memory, wherein execution of the programming by the processor configures the computing device to perform functions, including functions to:
(a) operate a domain adaptation framework comprising a source domain trained according to a source GAN, and a target domain trained according to the source domain and a target GAN;
(b) execute a training system operative to further train the target domain using one or more artistic datasets, wherein the training system comprises:
a camera alignment module operative to generate a statistical distribution based on a source set of camera parameters associated with the source domain, and to generate a target set of camera parameters for the target domain based on the statistical distribution,
a feature regularization module operative to apply to the target set of camera parameters a loss function and one or more feature regularizers, and
a geometric deformation module comprising one or more geometric deformations controlled in accordance with a Thin Plate Spline network,
wherein the training system produces an avatar GAN based on the camera alignment module, the feature regularization module, and geometric deformation module; and
(c) execute an avatar generation module operative to capture an image and to generate an avatar based on the image in accordance with the avatar GAN.

7. The system of claim 6, wherein the avatar generation module is further configured to:
project the image onto a latent space associated with the source GAN, wherein the latent space is represented by a latent code;
transfer the latent code to the avatar GAN; and
render the avatar in accordance with the latent code.

8. The system of claim 6, wherein the source GAN comprises a three-dimensional GAN,
wherein the target GAN comprises a two-dimensional GAN, and
wherein the one or more artistic datasets comprises a plurality of sample images, each associated with two-dimensional data.

9. The system of claim 6, wherein the one or more artistic datasets comprises a plurality of sample images, each associated with a style type and one or more attribute classifiers,
wherein the style type is an artistic style selected from a group consisting of caricature, Pixar, cartoon, and comic.

10. The work system of claim 6, wherein the feature regularization module further comprises:
an adversarial loss obtained during the training;
a texture regularization applied to one or more layers;
a geometry regularization calculated according to a derivation parameter associated with an S latent space; and
a depth regularization associated with an average background depth.

11. A non-transitory computer-readable medium storing program code comprising instructions which, when executed by a processor, are operative to cause the processor to perform functions including:
selecting a source domain trained according to a source GAN;
selecting a target domain trained according to a target GAN;
training the target domain with an artistic dataset, wherein training the target domain comprises:
calculating a statistical distribution based on a source set of camera parameters associated with the source domain,
applying the statistical distribution to estimate target set of camera parameters for the target domain,
applying to the target set of camera parameters a loss function and one or more feature regularizers, and
controlling one or more geometric deformations in accordance with a Thin Plate Spline network, such that the training produces an avatar GAN based on the target set of camera parameters, the loss function, the one or more feature regularizers, and the one or more geometric deformations;
capturing an image of an object; and
generating an avatar based on the image in accordance with the avatar GAN.

12. The medium of claim 11, wherein generating the avatar further comprises:
projecting the image onto a latent space associated with the source GAN, the latent space represented by a latent code;
transferring the latent code to the avatar GAN; and
rendering the avatar in accordance with the latent code.

13. The medium of claim 11, wherein the source GAN comprises a three-dimensional GAN, and
wherein the target GAN comprises a two-dimensional GAN.

14. The medium of claim 11, wherein the artistic dataset comprises:
a plurality of sample images, each associated with a style type and one or more attribute classifiers,
wherein the style type is an artistic style selected from a group consisting of caricature, Pixar, cartoon, and comic.

15. The medium of claim 11, wherein applying the loss function and the one or more feature regularizers further comprises:
applying an adversarial loss obtained during the training as a main loss function;
applying a texture regularization to one or more layers;
applying a geometry regularization according to a derivation parameter associated with an S latent space; and
applying a depth regularization according to an average background depth.

* * * * *